United States Patent
Malchow

(10) Patent No.: US 10,463,038 B2
(45) Date of Patent: Nov. 5, 2019

(54) METHOD FOR OPERATING A PROTECTIVE DEVICE FOR ELEMENTS IN A VEHICLE

(71) Applicant: Robert Bosch GmbH, Stuttgart (DE)

(72) Inventor: Florian Malchow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/781,247

(22) PCT Filed: Nov. 2, 2016

(86) PCT No.: PCT/EP2016/076428
§ 371 (c)(1),
(2) Date: Jun. 4, 2018

(87) PCT Pub. No.: WO2017/092954
PCT Pub. Date: Jun. 8, 2017

(65) Prior Publication Data
US 2018/0352804 A1 Dec. 13, 2018

(30) Foreign Application Priority Data

Dec. 2, 2015 (DE) .................. 10 2015 224 000

(51) Int. Cl.
*A01M 29/18* (2011.01)
*B60R 99/00* (2009.01)

(52) U.S. Cl.
CPC ....... *A01M 29/18* (2013.01); *B60R 2099/005* (2013.01)

(58) Field of Classification Search
CPC .................. A01M 29/18; B60R 2099/005
USPC ........................................ 340/425.5
See application file for complete search history.

(56) References Cited

U.S. PATENT DOCUMENTS 9,632,178 B2 * 4/2017 Kim .................. G01S 7/527

FOREIGN PATENT DOCUMENTS

| DE | 102006043995 A1 | 3/2008 |
| DE | 102007007465 A1 | 8/2008 |
| JP | 2008289432 A | 12/2008 |

OTHER PUBLICATIONS

"Power semiconductors open up energy saving potentials", Elektronikpraxis, Feb. 23, 2013, p. 1, paragraph 7, Retrieved from Internet: URL:http://www.elektronikpraxis.vogel.de/1eistungselektronik/articles/396193/.
International Search Report with English translation and Written Opinion for Application No. PCT/EP2016/076428 dated Feb. 1, 2017 (13 pages).

* cited by examiner

*Primary Examiner* — Daryl C Pope
(74) *Attorney, Agent, or Firm* — Michael Best & Friedrich LLP

(57) ABSTRACT

A method for operating a protective device for elements in a hybrid or electric vehicle, wherein at least one electric machine and at least one electrical power system, generates noise in the ultrasonic range.

14 Claims, 1 Drawing Sheet

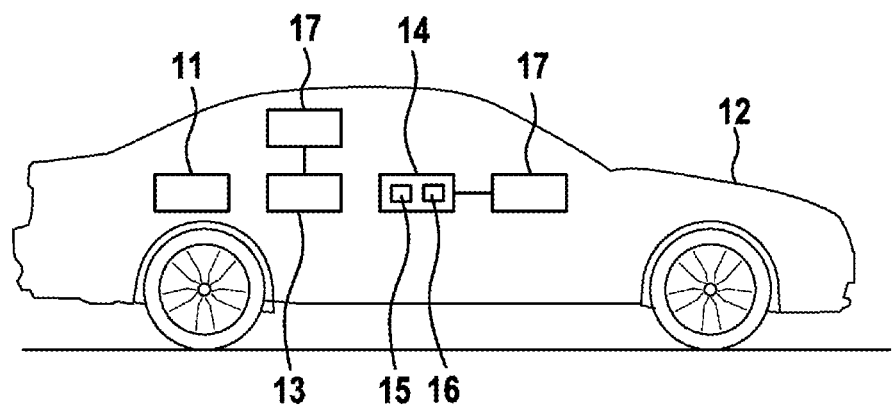

METHOD FOR OPERATING A PROTECTIVE DEVICE FOR ELEMENTS IN A VEHICLE

BACKGROUND OF THE INVENTION

The present invention relates to a method for operating a protective device for elements in a vehicle.

Bites to cars by martens became an issue in the 80s. The annual damage to motor vehicles by martens is estimated at several hundreds of thousands of cases. In the year 2011 alone there were over 229,000 insurance cases noted by the professional body of the German insurance business. However, the true figures are significantly larger since the insurance statistics only cover damage which clients have made public. Particularly the beech marten has become accustomed to the living habits of people and is increasingly living in their proximity as a species which can adapt to humans. In this context it has been found that, as has been long assumed, stone martens do not form nests in cars because they are attracted to the smell of hot rubber or to the composition of the plastics but rather simply because of their behavior. The engine cavity provides the beech martens with an attractive refuge with versatile possibilities. In this context, vehicles which commute between different locations and are parked in the open over night are particularly at risk. Once different martens at the two locations have marked their respective territory in the vehicle, the animals attempt to defend this territory, resulting in biting attacks. For a vehicle owner, damage by martens can become an expensive and also dangerous matter. Insulating materials in the engine compartment are the least of the car owner's problems here. Cables and hoses of all types (axle boots, spark plug cables, cooling water pipes, brake lines, pipes of the windscreen wiper system, lambda probe cables, etc.) are at particular risk and are preferred objects for biting. In this context, the bite points are sometimes difficult to discover, since the sharp teeth of the animals leave indents which are approximately only the size of a knitting needle.

Possible consequences are, for example, immobilization (as a result of defective ignition cable), a vehicle fire (as a result of insulating material which has caught fire) or an accident (as a result of a defective brake line). It is thus appropriate to take defensive measures throughout the year.

It is known to use a sheath to protect elements in motor vehicles, in particular lines such as, for example, ignition lines, which are freely accessible and are at risk from bites by wild animals, specifically bites by martens. Since the lines generally run in a curved fashion owing to the restricted spatial conditions in a motor vehicle, the sheath is formed by juxtaposition of what are referred to as individual beads. These individual beads are short tubular sections whose walls are embodied in a stepped fashion such that they can be mounted in a partially overlapping fashion and laid in a curved fashion. A disadvantage with this sheath is that it is costly, since it is composed of beads which have to be manufactured individually and which have to be counted as they are applied to the lines to be protected, with the result that in addition to high manufacturing costs the sheath is also burdened with high mounting costs as a result of the type of mounting.

Further defensive measures would be wire mesh under the engine compartment or large repellent objects under the vehicle. However, these often have a chronologically limited effect. Martens are very careful animals and usually do not behave in a risky way, but although they avoid unaccustomed fixtures for a certain time, they do not do so for ever.

High-voltage devices are also known for repelling martens. Contact panels which are mounted in the engine compartment and are charged by a high-voltage generator give the marten an electric shock on contact, in accordance with the electric fence principle. The positive effect here is that it keeps away martens over the long term without injuring them (source: Wikipedia/Marderabwehr [Protection against martens]). However, an electric current requires a circuit to be closed. A ground (negative pole) is necessary for this, for example via the bodywork of the vehicle or other blank metal motor parts. Water hoses are also composed of conductive material. It is disadvantageous therefore that the required negative pole is transported via the vehicle. In addition, it is disadvantageous that in newer vehicles there are fewer conductive surfaces available, since construction in the engine compartment features a large amount of plastic, surface coating agents and sound insulation.

There is therefore a need for a more effective and more cost-effective protective device in a vehicle.

SUMMARY OF THE INVENTION

The method according to the invention has the advantages that additional devices in or under the engine compartment and risks for persons (e.g. drivers etc.) as a result of live bodywork parts are dispensed with.

According to the invention there is provision that in the method for operating a protective device for elements, in particular exposed lines, in a vehicle, preferably a hybrid vehicle or electric vehicle which has at least one electric machine and at least one electrical power system, a noise in the ultrasonic range is generated within the electrical power system and/or within the at least one electric motor. With this method it is advantageous that the generation of noise does not take place in a specially provided loudspeaker but rather is generated in the machine/the motor of the vehicle itself as well as within electronic power systems which during normal operation assume different tasks instead of functioning as a protective device for the vehicle.

It is advantageous that the noise in the ultrasonic range is generated by high frequency clocking of the at least one electrical power system. The term ultrasonic is used to denote sound with frequencies above the frequency range which can be heard by the human ear. It comprises frequencies starting from approximately 16 kHz. High frequency clocking of the electrical power system in a frequency range which corresponds to the frequency range of ultrasonic sound therefore results in ultrasonic sound waves which have a deterrent effect on wild animals, preferably martens.

It is also advantageous that at least one power semiconductor, preferably at least one bipolar transistor with an insulated gate electrode (IGBT) is clocked at high frequency within the at least one electrical power system. Bipolar transistors with an insulated gate electrode are used as semiconductor components in power electronics, since they combine advantages of the bipolar transistor and advantages of a field effect transistor. These IGBTs can be switched with the desired high frequency clocking rate so that noises are generated which lie in the ultrasonic range.

It is also advantageous that at least one field effect transistor (preferably a MOSFET) within the at least one electrical power system is clocked at high frequency. Field effect transistors are used not only in bipolar transistors but also in power electronics and can also be clocked at high frequency, for which reason they are also suitable for generating a noise in the ultrasonic range.

The noise in the ultrasonic range can also be advantageously generated by high frequency pulsation operation of the at least one electric machine. Servomotors, traction drives or electric actuator drives—e.g. EC motors, DC motors—are used at many locations in the vehicle and can therefore be used to generate noise.

Furthermore, with respect to the generation of noise it is advantageous that the at least one electrical power system is connected to at least one resonator which is excited to resonate by the noise generated in the ultrasonic range. The resonator advantageously amplifies the resonance of the noise.

It is also advantageous that the noise in the ultrasonic range is generated at the time when animals or living beings approach the vehicle. This means that it is detected whether animals or living beings stop or are located in the vicinity of the vehicle and a noise is generated only in this case.

The noise is advantageously generated in the frequency range of 16-40 kHz. This is the preferred frequency range in which wild animals preferably respond.

The generation of noise takes place both in the stationary state of the vehicle and during operation. It is therefore not absolutely necessary for the vehicle to be operating (vehicle parked but engine running). Instead, the vehicle can also be in a stationary state and it can be detected whether an animal or living being is present in the vicinity of the vehicle, and for this case noise can be generated according to the method according to the invention.

Further features and advantages of the present invention are apparent to a person skilled in the art from the following description of exemplary embodiments, which are, however, not to be interpreted as limiting the invention, with reference to the appended drawing.

BRIEF DESCRIPTION OF THE DRAWING

In the drawing:
FIG. 1 shows a schematic illustration of a vehicle.

DETAILED DESCRIPTION

FIG. 1 shows a schematic illustration of a vehicle 12. This vehicle 12 can be a vehicle with an internal combustion engine, a hybrid vehicle as well as a pure electric vehicle. The vehicle 12 comprises elements 11 such as, for example, axle boots, spark plug cables, cooling water pipes etc. Furthermore, the vehicle 12 has at least one electric machine 13, these preferably being DC or EC motors (electric actuator drives or traction drives). In addition, electrical power systems 14 are installed in the vehicle 12. The electrical power systems 14 can be, for example, the inverters or else DC/DC converters or other power electronics components such as charger devices etc. of a hybrid vehicle or electric vehicle. It is alternatively also possible for the electrical power systems 14 to comprise charger systems which are arranged both in the vehicle 12 and outside the vehicle 12, such as, for example, charging pillars or inductive charging devices. The power electronics systems 14 comprise power semiconductors 15, these preferably being bipolar transistors with an insulated gate electrode (IGBT) or field effect transistors (MOSFETs) as well as intermediate circuit capacitors. The invention therefore implements a new function using hardware which is already present. No additional manufacturing costs are incurred, and the expenditure occurs, in particular, in the development or adaptation of existing software.

The method according to the invention is advantageously of particular interest during the charging of electric vehicles or hybrid vehicles. In particular in the case of inductive charger systems 18 (not illustrated here) it is necessary to avoid animals entering the vicinity of strong magnetic fields. Although this can be detected, it generally brings about switching off or a reduction in the power of the charging process. In the method according to the invention, a noise in the ultrasonic range is generated within the electrical power system 14. For this purpose, this noise is generated by high frequency clocking of the electrical power system, with the frequency range of the noise being in the ultrasonic range. Within the electrical power system 14, power semiconductors 15 such as, for example, bipolar transistors with an insulated gate electrode (IGBT) or field effect transistors (MOSFET) are clocked at high frequency in this respect. Furthermore, the noise can also be generated by high frequency clocking or by high frequency pulsation operation of the electric machine 13. All the electric actuators or actuator drives or traction drives such as, for example, DC and EC motors are considered to be electric machines. In order to amplify the ultrasonic noise, resonators are used which are optionally connected to the electrical power system 14 or to the electric motor 13. These resonators or this resonator is in contact with them and is excited to resonate.

Alternatively, in the case of electrical power systems 14, for example a high frequency signal is typically superimposed/modulated onto the actuation of an electric motor 13, without the main function, for example the current regulation, being subjected to a significant adverse effect. In the case of a deactivated main function or if possible in parallel with the main function of the respective component, the additional signal component is selected in such a way that noise is generated in the range from approximately 16-40 kHz. The hardware which is used to generate the noise can advantageously already be configured in the design process in such a way that a corresponding noise can easily be generated.

The invention claimed is:
1. A method for operating a protective device (10) for elements (11) in a hybrid vehicle or electric vehicle which has at least one electric motor (13) and at least one electrical power system (14), the method comprising generating a noise in the ultrasonic range within the electrical power system (14) and/or within the at least one electric motor (13) while the hybrid vehicle or electric vehicle is in a stationary state.

2. The method for operating a protective device (10) as claimed in claim 1, characterized in that the noise in the ultrasonic range is generated by high-frequency clocking of the at least one electrical power system (14).

3. The method for operating a protective device (10) as claimed in claim 1, characterized in that at least one power semiconductor (15) is clocked at high frequency within the at least one electrical power system (14).

4. The method for operating a protective device (10) as claimed in claim 2, characterized in that at least one field effect transistor (16) within the at least one electrical power system (14) is clocked at high frequency.

5. The method for operating a protective device (10) as claimed in claim 1, characterized in that the noise is generated by high frequency clocking or high-frequency pulsation operation of the at least one electric motor (13).

6. The method for operating a protective device (10) as claimed in claim 1, characterized in that at least one resonator (15), which is excited to resonate by the noise generated in the ultrasonic range, is connected to the at least one electrical power system.

7. The method for operating a protective device (10) as claimed in claim 1, characterized in that the noise in the ultrasonic range is generated if animals or living beings approach the vehicle (12).

8. The method for operating a protective device (10) as claimed in claim 1, characterized in that the noise is generated in the frequency range from 16 to 40 kHz.

9. The method for operating a protective device (10) as claimed in claim 1, characterized in that the noise is generated both when the vehicle (12) is operating and when the vehicle is in the stationary state.

10. The method for operating a protective device (10) as claimed in claim 2, characterized in that at least one bipolar transistor with an insulated gate electrode (IGBT) is clocked at high frequency within the at least one electrical power system (14).

11. The method for operating a protective device (10) as claimed in claim 2, characterized in that at least one MOSFET within the at least one electrical power system (14) is clocked at high frequency.

12. A method for operating a protective device (10) for exposed lines in a hybrid vehicle or electric vehicle which has at least one electric motor (13) and at least one electrical power system (14), the method comprising generating a noise in the ultrasonic range within the electrical power system (14) while the hybrid vehicle or electric vehicle is in a stationary state.

13. The method as claimed in claim 12, further comprising generating a noise in the ultrasonic range within the at least one electric motor (13).

14. A method for operating a protective device (10) for exposed lines in a hybrid vehicle or electric vehicle which has at least one electric motor (13) and at least one electrical power system (14), the method comprising generating a noise in the ultrasonic range within the at least one electric motor (13) while the hybrid vehicle or electric vehicle is in a stationary state.

* * * * *